United States Patent [19]

Stimmel

[11] Patent Number: 4,785,153

[45] Date of Patent: Nov. 15, 1988

[54] PROCESS AND DEVICE FOR RECIPROCAL GUIDANCE OF WORKPIECES AND TOOLS THAT MOVE RELATIVE TO ONE ANOTHER, PARTICULARLY ROLLING SEAM WELDING MACHINES

[75] Inventor: Burkhard Stimmel, Augsburg, Fed. Rep. of Germany

[73] Assignee: Kuka Schweissanlagen + Roboter, Fed. Rep. of Germany

[21] Appl. No.: 11,940

[22] Filed: Feb. 6, 1987

[30] Foreign Application Priority Data

Feb. 7, 1986 [DE] Fed. Rep. of Germany ....... 3603919

[51] Int. Cl.[4] .............................................. B23K 11/24
[52] U.S. Cl. ................................... 219/86.41; 219/82; 901/42
[58] Field of Search ............. 219/78.01, 81, 82, 86.25, 219/86.41; 901/42

[56] References Cited

U.S. PATENT DOCUMENTS 4,591,944 5/1986 Gravel ............................. 219/86.41
4,652,719 3/1987 Fujita et al. ............................ 219/82

FOREIGN PATENT DOCUMENTS 56-212681 5/1983 Japan .
59-107778 6/1984 Japan ..................................... 219/81
59-61581 7/1984 Japan .
90200 6/1950 U.S.S.R. .
518300 7/1976 U.S.S.R. ................................ 219/81

Primary Examiner—Clifford C. Shaw
Attorney, Agent, or Firm—McGlew and Tuttle

[57] ABSTRACT

The invention relates to a process for guiding workpieces on a rolling seam welding machine or vice versa. In the process the relatively moved part is driven via its guide means of a continuous path manipulating device in an extra conveyor motion in the same direction and with the same speed as a tool-caused conveyor motion. The two conveyor motions are monitored for synchronicity by a displacement sensor that is connected for control purposes with a control unit of the manipulating device. When a difference occurs between the two conveyor speeds, manifested by the turning of the moved part around the displacement sensor, one of the two conveyor speeds is readjusted, with short-term over-compensation of the difference.

14 Claims, 4 Drawing Sheets

PROCESS AND DEVICE FOR RECIPROCAL GUIDANCE OF WORKPIECES AND TOOLS THAT MOVE RELATIVE TO ONE ANOTHER, PARTICULARLY ROLLING SEAM WELDING MACHINES

FIELD AND BACKGROUND OF THE INVENTION

This invention relates in general to welding and in particular to a new and useful process and device for a reciprocal guidance of workpieces and tools that move relative to one another particularly for effecting rolling seam welding.

German patent disclosure No. 29 28 620 discloses a process and a device for guiding a workpiece on a rolling seam welding machine, whereby the workpiece is guided and moved with respect to the rolling seam welding machine on a pre-set path by means of a joint arrangement and a slot link. Conveyance is accomplished with this device entirely by means of the two driven contact rollers frictionally engaged with the workpiece that pull the workpiece along with the joint arrangement. It keeps to the rolling seam path thanks to monitoring by an optical sensor on the link that moves along with the joint arrangement. In order to correct deviations from the path, a special rotary drive is provided on the joint arrangement that rotates a pivoting holding trough in which the workpiece is seated counter to the direction of deviation.

The prior art device has the disadvantage that it is not well suited for components of large dimensions and heavy weight. Furthermore, a costly auxiliary device is required to control and correct deviations from the path, a device which must be changed, moreover, when the type or workpiece is changed.

SUMMARY OF THE INVENTION

The present invention provides a device and method for guiding even bulky and heavy workpieces and makes the re-setting work easier.

The invention process and apparatus allows for many variants. For one thing, it does not matter whether the workpiece is guided and moved with respect to the tool or the tool with respect to the workpiece. This relative motion can be achieved, furthermore, in addition to an absolute motion of both parts.

Any deviations from the preset rolling seam path can be detected by means of a speed differential, which may be determined easily either directly or indirectly. The process involves monitoring as primary data the relative relationship of the two speeds to one another and not a possible deviation from an absolute norm. Absolute value control can, of course, be applied secondarily. The correction of any deviations from the path is accomplished simply without auxiliary rotary drives by equalizing the two speeds with short-term compensation of the incurred differential. In this process it is basically unimportant from which drive the difference originated. To make the correction, either the contact roller drive or the guide drive can be readjusted.

According to the invention, the process and corresponding devices are suitable not only for rolling seam welding machines, but also for other tools or machine tools where the driven tool effects a conveyance of the workpiece.

The synchronization of the conveyor speeds can be monitored by a different method. For one thing, it is possible to read the guide speed and the roller conveyor speed directly by means of speed sensors and compare them. A particularly easy and precise method of monitoring, which is furthermore independent of the size and shape of the moved part, can be achieved with the use of a displacement sensor. It detects a path deviation as a motion or torque of one of the two parts around its mounting. This is preferably done on the moved part, but can be applied as well to the part at rest relative thereto.

The process according to the invention and corresponding device permit the tracking of rolling weld seams that are as complicated and three-dimensional as desired. This is also true for flanges or rolling weld seams twisted around the direction of the flange extension. It is also an advantage that it can quickly correct all path deviations regardless of whether they are caused by faulty gripping, by speed differences or by other factors.

The solution according to the invention also permits secure seam tracking on curves, not allowing slippage between the contact rollers and the workpiece to affect the course of the seam. This also improves the quality of the weld seam, in that outside influences, such as partial material changes, increases in temperature and the like, are compensated for.

To guide the moving part, preferably the workpiece, it is recommended that a continuous path control manipulatng device, preferably a multi-axis industrial robot, be used.

The path control is thus accomplished merely by means of a program, which can be changed easily when there is a change of workpiece. A continuous path industrial robot can also guide the workpiece back and forth.

It is recommended that the displacement sensor be positioned on the mounting bracket of the manipulator and that the measuring signals be fed into the controls of the manipulator to readjust guide speed. This is particularly advantageous when workpieces with curved rolling seam paths are to be welded. In this situation, it is particularly recommended that the mounting bracket and the displacement sensor be so positioned with respect to the workpiece that they are roughly the same distance from all radial centers of the curbed rolling seam path. In this way, guide speeds that are different and too high at the mounting bracket are avoided.

In order to work on pieces whose shapes do not permit such an arrangement, it is recommended that the mounting bracket and the displacement sensor be connected adjustably along one or more extra axes with the workpiece or its clamping device. The displacement sensor, however, may also be firmly connected to the clamping device and be moved along with the clamping device in the adjustment with respect to the mounting bracket. Because of the opportunity for adjustment, the distances to the radial centers can be changed, preferably shortened, and limit the guide speeds conveyed via the mounting bracket of the manipulator.

Differences between the conveyor speed of the contact rollers and the guide speed of the workpiece at the clamping point between the contact rollers or a deviation induced by other factors of the contact rollers from the rolling seam path lead to faulty gripping or turning of the workpiece around the mounting bracket of the manipulator.

In consequence, the displacement sensor is designed differently. In a preferred embodiment a torque sensor is provided that has a high sensitivity and can measure the torque incurred in terms of the extent and direction. Its sensitivity can be further increased by enlarging the measurement basis by means of extension arms. In the simple embodiment shown, the rolling seam path runs in one plane so that only torque around the normal axis of the plane needs to be detected. For complicated rolling seam paths, correspondingly more expensive, multi-dimensional torque sensors are needed, capable of measuring force and torque in up to six axes.

Accordingly it is an object of the invention to provide a device for regulating the movement of a workpiece to effect the welding thereof and which comprises a movable tool which is engageable with the workpiece for moving the workpiece and for effecting the welding along a continuous welding seam and which includes a manipulator which is engageable with the workpiece for employing a motion in a similar direction to that imparted by the movable tool and which includes a sensor connected between the manipulator and the movable tool for sensing any variation of movement between them and which acts upon one of the movable tools or the manipulator for adjusting the speed correspondingly.

A further object of the invention is to provide a process of regulating movement of a workpiece to effect the welding thereof and using a manipulator to move the workpiece and using a tool that engages the workpiece to weld it and to move it which comprises sensing the relative movement of the drive of the workpiece by the tool and the drive of the workpiece by the manipulator and acting on at least one of the drives for adjusting the speed depending upon the sensing.

A further object of the invention is to provide a device for manipulating a tool for the purpose of welding it which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
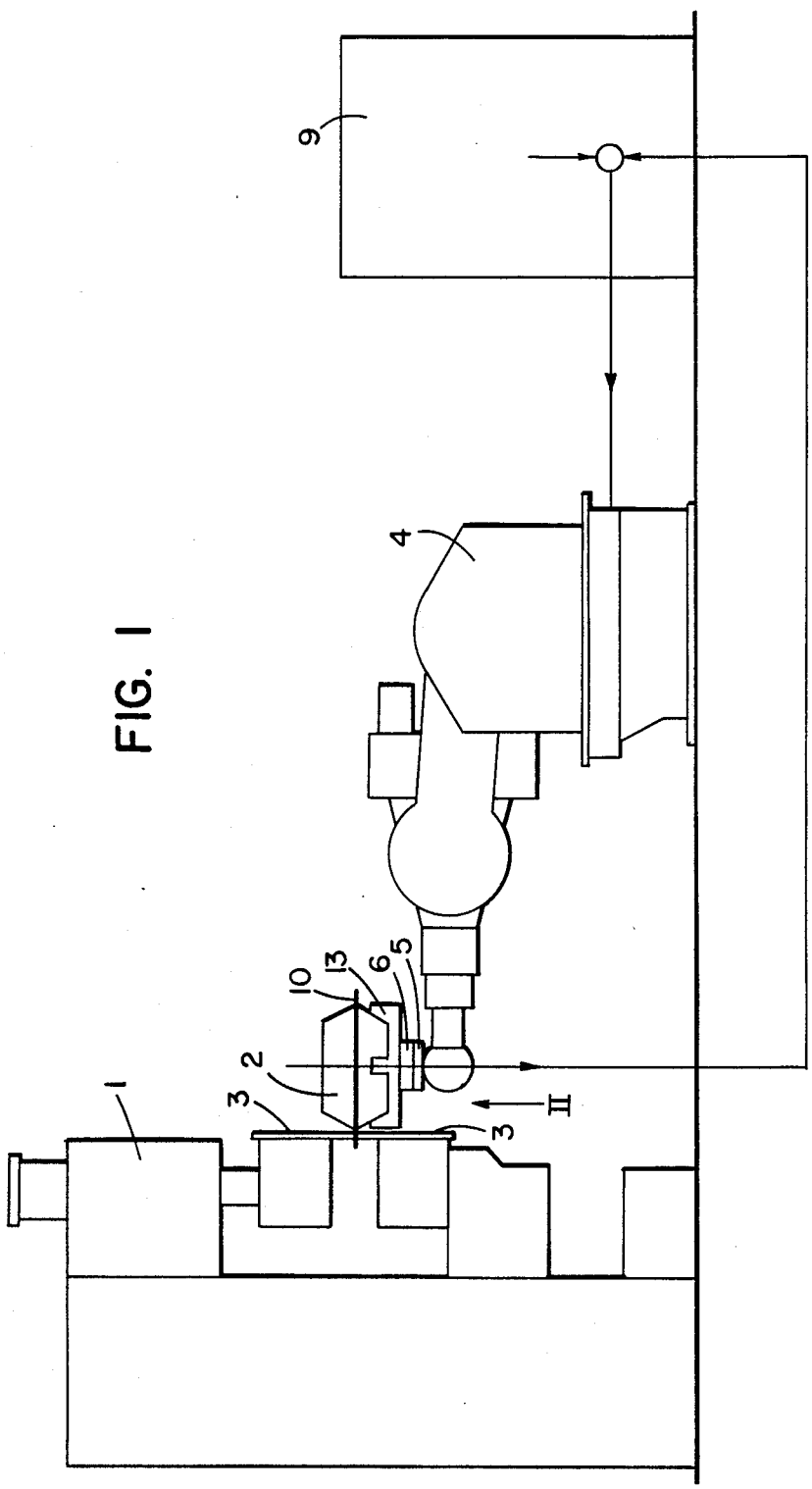
FIG. 1 is a side elevational view of a rolling seam welding machine and a workpiece guided by means of a manipulating device.

Referring to the drawings in particular the invention embodied therein comprises a device for an apparatus for regulating the movement of a workpiece 2 to effect the welding thereof around a continuous seam 11 to join mating flanges of workpiece parts having a continuous encircling flange 10. The movable tool comprising a pair of rotating rollers 3. Rollers 3 arranged in opposition and engage the workpiece for other sides and effect the welding of the workpiece parts as well as a movement which is continuous along a welding seam. In addition to the motion imparted through the action of movable tool 3, there is a manipulator 4 which engages the workpiece from imparting a motion in a similar direction to the imparting of a motion of the workpiece by the two operating roller members 3 of the tool. In accordance with the invention, sensor means 6 are connected between the tool 3 and the manipulator 4 acting on the workpiece 2 to sense any variation of movement imparted by either the tool 3 or the manipulator 4.

Figure 5:
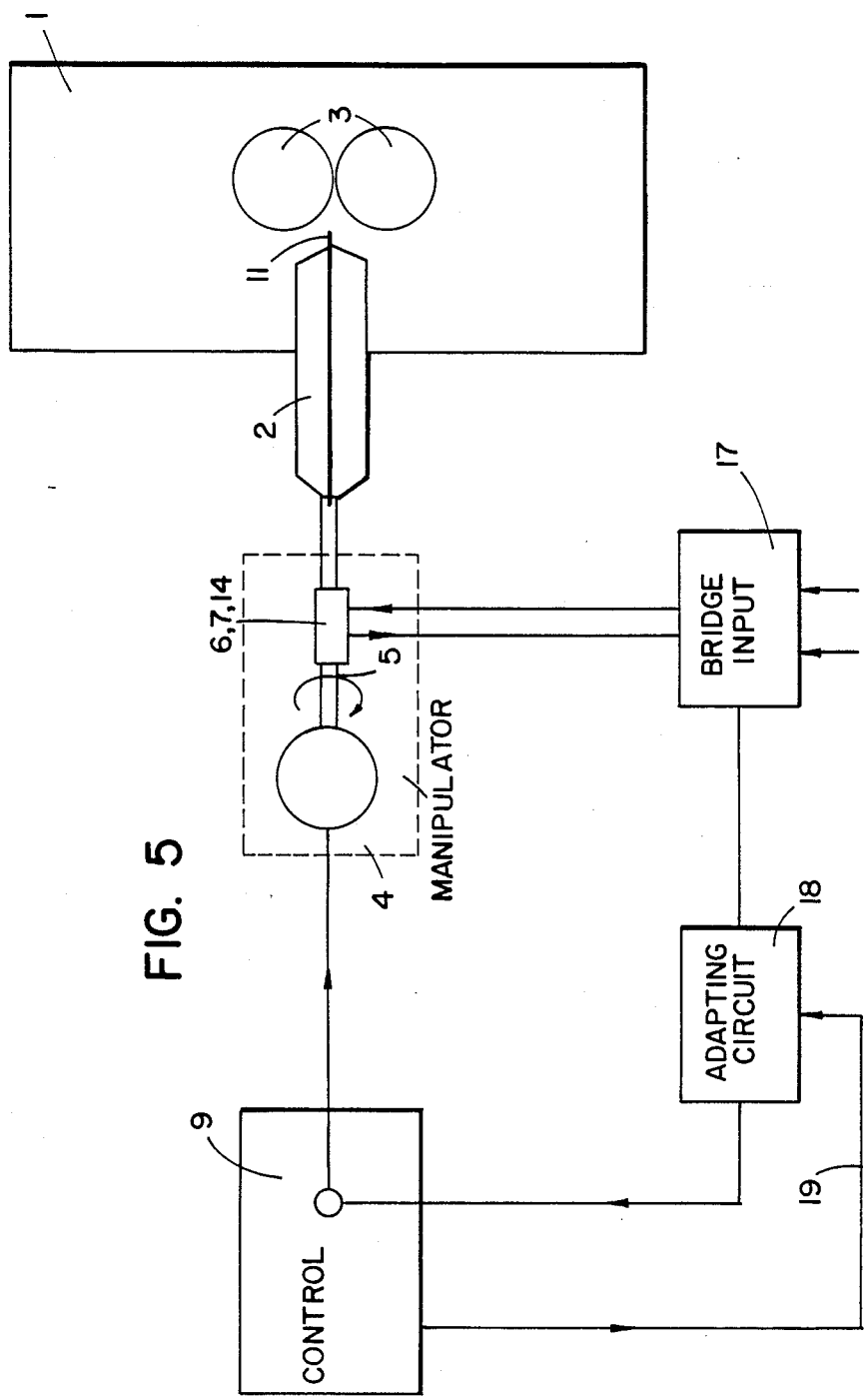
FIG. 5 is a basic wiring diagram for the control circuit for the guidance.

Sensor means 6 are connected in a circuit as indicated in FIG. 5 through a control 9 and a connecting circuit to act upon the manipulator 4 and/or the drive for the tool so as to adjust the movement imparted to the workpiece so as to provide a corresponding motion inputs to the workpiece 2.

FIG. 1 shows a stationary rolling seam welding machine 1 with two contact rollers 3 installable opposite one another. The rollers 3 being driven separately or jointly by a motor, (not shown). The workpiece 2 in the example shown is a tank or the like whose two halves were previously tacked on an encircling flange 10 and are now to be welded in the rolling seam welding machine 1 see FIG. 2. The workpiece 2 is fastened to a clamping device 13, which is connected through a displacement sensor 6 with the mounting bracket 5 of a manipulating device 4, in this instance a multi-axis industrial robot. The industrial robot 4 is controlled in a continuous path represented by a program in the control unit 9. It is thus possible to dispense with a sot link, limit stops or the like.

Figure 2:
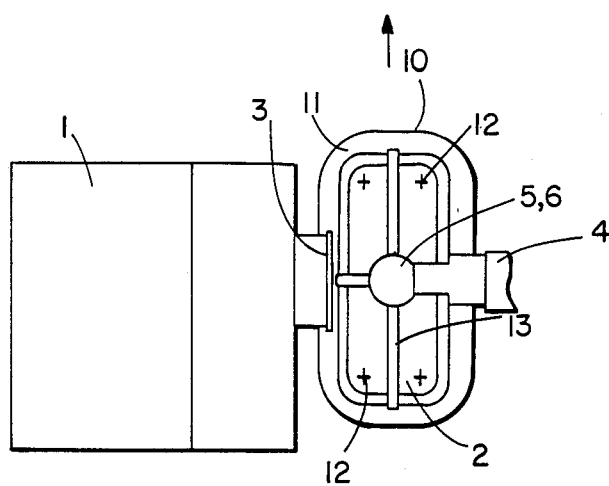
FIG. 2 is a bottom plan view of the workpiece with clamping means, seen in the direction indicated by the arrow II in FIG. 1.

During the welding process, the encircling flange 10 is held friction tight between the two contact rollers 3, which thus advance the workpiece 2 in the direction of the arrow 30, see FIG. 2. The rolling seam welding process then proceeds concentrically along the rolling seam pathall running the length of the flange 10. The workpiece 2 is guided and driven in this process by the industrial robot 4. The direction of motion and the guide speed are determined by the path control unit, which as the course of the rolling seam path 11 programmed into it. The industrial robot 4 thus guides the workpiece 2 in a straight line through the contact rollers 3 on the long sides of the flange 10 and turns it at the corners or curved portions of the flange, so that both conveyance directions always coincide. The continuous path control is so coordinated with the rolling seam welding machine 1 that the conveyor speed with which the flange 10 is moved through the contact rollers 3 is exactly the same as the conveyor speed of the contact rollers 3.

Due to wear of the contact rollers 3, slippage, irregularities in the flange 10 or other circumstances, a difference may arise between the guide speed of the manipulator 4 and the conveyor speed of the contact rollers 3. If the frictional engagement between contact rollers 3 and flange 10 is maintained, this leads to torque around the holding bracket 5, distanced from the clamping point, manifested in faulty gripping or a deviant motion of the workpiece 2. In both cases, the result is a deviation of the contact rollers 3 from the preset rolling seam path 11. This is particularly critical in the curved areas of the flange 10. Torque also occurs even when conveyor speeds are the same if due to imprecision in the path control or other factors the contact rollers 3 deviate from the rolling seam path 11.

A similar mismatch in conveyor forces, resulting in torque as indicated above, also ensues when there is slippage in the clamping point between the contact rollers 3 and flange 10. This can also have a negative impact on weld quality and adherence to the rolling seam path !1.

As FIG. 2 shows, the workpiece 2 is held by a clamping device 13. The clamping device is connected via a displacement sensor 6 with the mounting bracket 5 of the industrial robot 4. The mounting bracket 5 in this instance is the rotary take-off end of the industrial robot 4, known as the robot's hand. As FIGS. 1 and 2 show, the longitudinal axes of the mounting bracket 5 and the displacement sensor 6 coincide, and they are so connected at a distance from the encircling flange 10 with the clamping device 13 that they are at an equal distance from all the radial centers 12 of the curved portions of the flange 10. Any torque around the axis of the mounting bracket 5 introduced via the clamping device 13 will be detected in terms of extent and direction by the displacment sensor 6.

The displacement sensor 6 sends this measurement signal over the circuit to be described below and shown in FIG. 5 to the control unit 9 of the industrial robot 4. The extent and direction of the torque constitute analog values for the extent and direction of the path deviation or the difference in conveyor speeds and conveyor forces. The control unit 9 compensates for this differential in conveyor speeds or forces by overlaying the continuous path control and increasing or decreasing the guide speed. The guide direction programmed into the continuous path control is maintained in the process. During the readjustment of the guide speed, a certain overcompensation occurs which temporarily establishes an opposing force couple or turning moment. This has the result that the path deviation is not only compensated but even retraced. The contact rollers 3 thus wander in an arc back to the preset rolling seam path 11. When they reach that position, the torque disappears and the workpiece 2 continues on with the continuous path control exercising its normal function.

Figure 3:
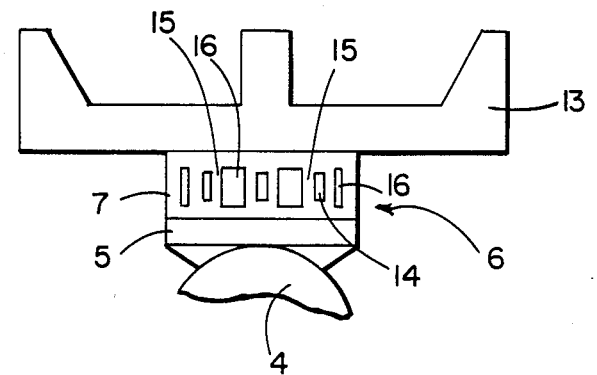
FIGS. 3 and 4 are enlarged partial side elevational views showing the displacement sensor of FIG. 1 and a possible alternative for the torque sensor.

In the example shown in FIG. 3, the sensor comprises a cylindrical tube in the shell of which are positioned recesses 16 leaving vertical, flexible bars 15 between them. On the bars 15 are positioned strain gauge strips 14 in a conventional fashion. Torque conveyed via the clamping device 13 twists the tube 7 of the torque sensor 8, whereupon the bars 15 are bent in accordance with the force and direction of that torsion.

Figure 4:
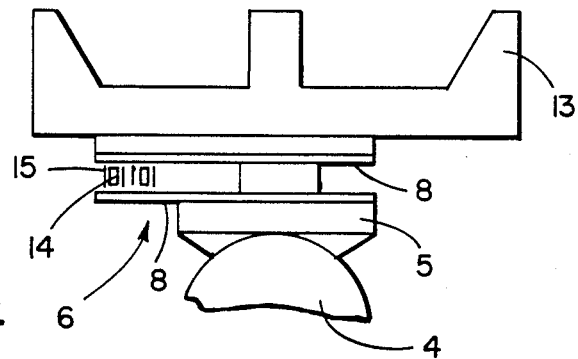

FIG. 4 shows an alternative design for the torque sensor 6. The clamping device 13 and the mounting bracket 5 are mounted axially on one another, but can turn counter to one another around the longitudinal axis of the mounting bracket. In this arrangement, there are positioned on the clamping device 13 and the mounting bracket 5 two radially projecting extensions 8 maintained at a distance from one another but covering the same area and connected on their ends by flexible bars 15 with strain gauge strips 14. By increasing the distance of the bars 15 from the axis of torsion, measuring sensitivity is increased.

Figure 6:
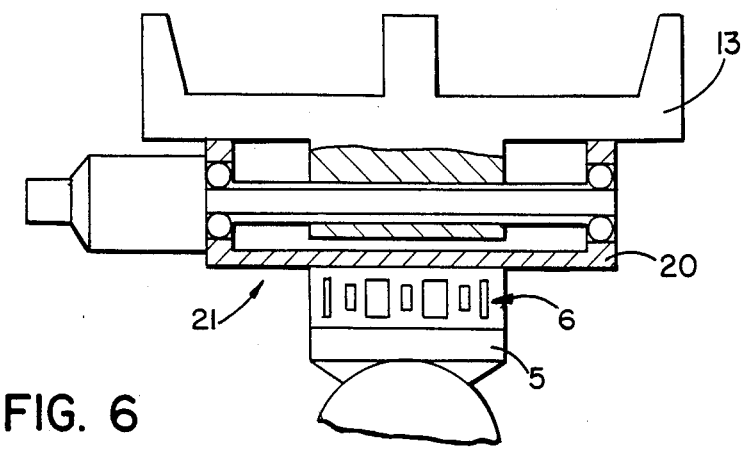
FIG. 6 is a view similar to FIG. 3 but including a mounting bracket with an extra adjustment device.
Figure 7:
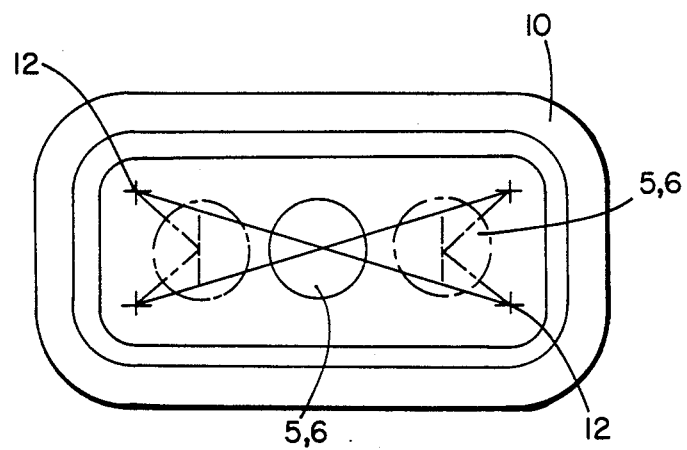
FIG. 7 is a view of the workpiece as in FIG. 2 but with an adjustment device pursuant to FIG. 6.

FIGS. 6 and 7 show an adjustment device with which the distance of the mounting bracket 5 from the radial centers 12 can be changed to produce different effects. An adjustment capability of this kind is particularly recommended for workpieces that are very long or complicated in shape. The larger the distance between centers, the higher the rotating speed that must be conveyed to the mounting bracket 5 in order to pivot the workpiece at the clamping point of the flange 10 with the requisite conveyor speed. This circumstance also causes problems with acceleration and braking. By means of the adjustment device, permitting a change of position with respect to one or more axes, those distances can be shortened.

In the embodiment shown, the clamping device 13 can move with respect to one axis in a guide frame 20 and has its position changed with respect to the mounting bracket 5 and the displacement sensor 6 by means of an adjusting drive 21. A guide frame 20 is rigidly connected on a side with the displacement sensor 6 and conveys to the sensor the torque transmitted from the clamping device 13. The adjusting drive 21 is control coupled with the continuous path control and consists preferably of an electrical servomotor with a displacement indicator and a drive spindle.

Pursuant to FIG. 7, for work on the straight segments of the flange 10 the mounting bracket 5 and the displacement indicator 6 are located in the center position of the adjustment device, where the straight lines connecting the radial centers 12 intersect. Before the curves on the flange are reached, the adjusting drive 21 moves the clamping device 13 with the workpiece 2, whereupon the mounting bracket 5 with the displacement sensor 6 ends up in the position indicated with dash-dotted lines with respect to the workpiece 2, in which position the distance to the closer radial centers 12 is markedly reduced. The adjusting motion is controlled by the continuous path control and compensated with the guide motion by the industrial robot 4, so that the guide speed occurring at the clamping point is not altered by the adjustment. For work on the long, straight segments of the flange, the clamping device 13 is moved back to the center position and subsequently into the other outer position.

Variations on the embodiment shown may be introduced, in that for purposes of multi-axis adjustment a guide frame 20 designed as a compound slide rest or the like can be installed with a corresponding adjusting drive 21. As another instance, the displacement sensor 6 may be fastened to the clamping device 13 and be movably mounted itself in the guide frame 20. It would then be moved, too, during adjustment.

FIG. 5 shows the basic wiring diagram for path readjustment. The torque sensor with strain gauge strips 14 will detect torque that occurs around the longitudinal axis of the mounting bracket 5 and measure it in terms of extent and direction. The measuring circuit used operates at a high cycle rate that allows it to detect torque even before the contact rollers 3 have actually deviated from the rolling seam path 11. The measurement signals from the strain gauge strips 14 installed different directions are conveyed to the bridge input 17, there evaluated and converted into a signal representing the torque in terms of extent and direction. This signal is transmitted to the control unit 9 of the manipulator 4 via an adapting circuit 18 and processed in a program with overlay of path control. The guide speed is increased or reduced for as long as the torque sensor 7 reports the existence of torque. Via a balancing line 19 and the adapting circuit 18, a null-balance procedure can be operated on the torque sensor 7 before a new workpiece 2 is fed into the rolling seam welding machine 1.

While specific embodiments of the invention have been shown and described in detail to illustrate the application of the principles of the invention, it will be understood that the invention may be embodied otherwise without departing from such principles.

List of Parts
(1) Tool, rolling seam welding machine, part
(2) Workpiece, part
(3) Contact roller
(4) Manipulator, industrial robot
(5) Mounting bracket
(6) Displacement sensor
(7) Torque sensor
(8) Extension
(9) Control unit
(10) Flange
(11) Rolling seam, rolling seam path
(12) Radial center
(13) Clamping device
(14) Strain gauge strip
(15) Bar
(16) Recess
(17) Bridge input
(18) Adapting circuit
(19) Balance line
(20) Guide frame
(21) Adjusting drive

What is claimed is:

1. A process for the reciprocal guiding of a workpiece using a device for moving a tool in association with the workpiece and a manipulator for moving the workpiece in a corresponding direction for effecting a rolling welding seam, comprising driving the workpiece by movement of the tool in contact with the workpiece while operating a manipulator to move the workpiece in a corresponding direction, monitoring the movement effected by the tool and the movement effected by the manipulator, and detecting any occurrence of a difference of synchronous movement of the two imparted movements, readjusting at least one of the movement of the workpiece by the tool and the movement of the workpiece by the manipulator by a short term compensation of the difference between them.

2. A process according to claim 1, including positioning the workpiece on a mounting bracket and detecting a difference in the speeds imparted by the tool and that imparted by the manipulator as a variation of the movement of one of two parts around the mounting bracket, and measuring the detected difference between the motion for extent and direction.

3. A process of regulating the movement of a workpiece to effect the welding thereof using a movable tool engageable with the workpiece for moving the workpiece and for effecting the welding thereof over a continuous welding seam and a manipulator engageable with the workpiece for imparting a motion in a similar direction to the imparting of a motion of the workpiece by said tool, comprising sensing the movement of the workpiece as it is driven by the tool relative to the movement of the workpiece as it is driven by the manipulator, and adjusting the speed imparted by one of the tool and the manipulator to the workpiece in accordance with the sensing.

4. A process according to claim 3, wherein the manipulator is connected to the workpiece by a support for the workpiece which is connected to the manipulator through a mounting bracket and a member forming a torque sensor and which includes measuring the torque sensed by the torque sensor as an indication of the relative speeds of impartation of motion to the workpiece.

5. A process according to claim 4, wherein said sensor is a strain gauge.

6. A device for regulating the movement of a workpiece to effect the welding thereof, comprising: a welding tool for effecting the welding of a workpiece over a continuous welding seam including a first contact roller and second contact roller positioned opposite one another, each roller being rotatively driven, said rollers engaging the workpiece to effect a welding seam as the engaged rollers are rotatively driven; a manipulator engaging said workpiece for supporting said workpiece and for moving said workpiece in a direction; sensor means connected between said manipulator and said tool through said workpiece for sensing any variation of movement between the movement of the workpiece by said manipulator and the movement of said workpiece caused by said driven rollers engaging the workpiece; and, adjusting means responsive to said sensor means for adjusting the speed of one of said rollers and said manipulator for an interval of time so that the movement of the 7. A device according to claim 6, wherein said manipulator has a rotating part having a mounting bracket, engagement means connected to said mounting bracket for holding the workpiece and said sensor being positioned between said mounting bracket and said engagement means, said sensor having a control for varying at least one of the movement of said tool and said manipulator.

8. A device according to claim 7, wherein said manipulator comprises a multiple axis industrial robot.

9. A device according to claim 7, wherein said means for mounting the workpiece comprises a clamp having means for securing the workpiece thereon, said sensor comprising a tubular member connected between said clamp and said mounting bracket, said clamp, and said mounting bracket and said sensor being aligned axially and in respect to the workpiece at a distance from the continuous welding seam.

10. A device according to claim 7, wherein said mounting bracket and said sensor are at substantially equal distances from wall radial centers of said welding seam.

11. A device according to claim 10, wherein said mounting bracket and said displacement sensor are slidably connected with said clamping device and said clamping device being offset relative to the axis of said sensor.

12. A device according to claim 7, wherein said sensor comprises a torque sensor.

13. A device according to claim 12, wherein said torque sensor has a cylindrical tubular portion having an outer skirt portion with spaced recesses defining flexible bars therebetween forming strain gauge strips.

14. A device according to claim 12, wherein said torque sensor has two radially projecting extensions spaced from one another and connected with one another by bars and having strain gauge strips between said bars.

* * * * *